(12) United States Patent
Suzuki et al.

(10) Patent No.: US 6,305,852 B1
(45) Date of Patent: Oct. 23, 2001

(54) CAMERA HAVING BARRIER MEMBER CAPABLE OF SMOOTHLY MOVING

(75) Inventors: Tatsuya Suzuki, Tokyo; Junji Shiono, Yokohama; Moriya Katagiri, Tokyo, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/333,112

(22) Filed: Jun. 15, 1999

(30) Foreign Application Priority Data

Jun. 18, 1998 (JP) .................................................. 10-171379

(51) Int. Cl.[7] .............................. G03B 5/02; G03B 17/00
(52) U.S. Cl. ........................................... 396/349; 396/448
(58) Field of Search .................................... 396/348, 349, 396/350, 439, 448, 535

(56) References Cited

U.S. PATENT DOCUMENTS

| 3,599,553 | * | 8/1971 | Hansen et al. | 396/448 |
| 4,019,192 | * | 4/1977 | Miyagawa | 396/349 |
| 4,367,028 | * | 1/1983 | Tomatsuri et al. | 396/448 |
| 4,522,478 | * | 6/1985 | Kando et al. | 396/448 |
| 4,556,304 | * | 12/1985 | Fukuda | 396/448 |
| 5,805,947 | * | 9/1998 | Miyamoto et al. | 396/448 |
| 5,943,521 | * | 8/1999 | Lamphron et al. | 396/448 |
| 6,036,376 | * | 3/2000 | Owashi et al. | 396/349 |

FOREIGN PATENT DOCUMENTS 58-163938   11/1983   (JP) .

* cited by examiner

*Primary Examiner*—David M. Gray
(74) *Attorney, Agent, or Firm*—Frishauf, Holtz, Goodman, Langer & Chick, P.C.

(57) ABSTRACT

A camera body has a photographing lens. A barrier member is mounted on the camera body to be movable between a position at which the photographing lens is exposed and a position at which the photographing lens is covered. At least two pairs of support portions are placed in pairs at opposing positions on the two sides of the photographing lens and contribute to support the barrier member. At least four rail portions separately engage with at least the two pairs of support portions on the two sides of the photographing lens.

6 Claims, 4 Drawing Sheets

CAMERA HAVING BARRIER MEMBER CAPABLE OF SMOOTHLY MOVING

BACKGROUND OF THE INVENTION

The present invention relates to a camera and, more particularly, to a camera having a barrier member that can smoothly move between a position at which a photographing lens is exposed and a position at which the photographing lens is covered.

In a small, handy camera, i.e., a so-called compact camera, the above barrier member has been widely used as a member for protecting the photographing lens in an unused state in place of a detachable lens cap that one looses too often.

As such a barrier member, for example, the barrier member in Jpn. UM Appln. KOKAI Publication No. 58-163938 is widely known.

In the camera disclosed in Jpn. UM Appln. KOKAI Publication No. 58-163938, a pair of cam grooves are formed in upper and lower portions of the camera body to guide a protective member serving as a barrier member to the first position at which the member covers the lens and the second position at which the lens is exposed.

The protective member has two pairs of pins that respectively engage with the upper and lower cam grooves at two positions in each groove.

Click portions for temporarily fixing the corresponding pair of pins when the protective member is placed at the first position and guide portions that allow the protective member to move outward along the optical axis of the lens by allowing the corresponding pair of pins to move outward along the optical axis of the lens while the protective member moves from the first position to the second position are formed in each of the upper and lower cam grooves.

In the camera disclosed in Jpn. UM Appln. KOKAI Publication No. 58-163938, however, while the protective member moves from the first position to the second position, the pair of pins corresponding to the entrances of the guide portions in the upper and lower cam grooves may be caught in the grooves. As a consequence, the protective member may not smoothly move to the first position.

In addition, according to the prior art, the protective member cannot be moved to the first position in some case.

BRIEF SUMMARY OF THE INVENTION

It is an object of the present invention to provide a camera having a barrier member that can smoothly move between an exposing position and a covering position so as to solve the above problem in the prior art.

In order to achieve the above object, according to an aspect of the present invention, there is provided a camera comprising:

a camera body having a photographing lens;

a barrier member mounted on the camera body to be movable between a position at which the photographing lens is exposed and a position at which the photographing lens is covered;

at least two pairs of support portions which are placed in pairs at opposing positions on two sides of the photographing lens and contribute to support the barrier member; and at least four rail portions each separately engaged with at least the two pairs of support portions on the two sides of the photographing lens.

In the camera having the barrier member according to the present invention, which has the above arrangement, at least two pairs of support portions engaged with at least the four rail portions contribute to support for the barrier member.

With this arrangement, the barrier member can smoothly move between the exposing position and the covering position.

In the camera having the barrier member according to the present invention, which is characterized by the above arrangement, the two pairs of support portions are formed on the barrier member, and the four rail portions are preferably formed by using members, other than the barrier member, including the camera body.

In addition, when the barrier member is located at the covering position, one pair of the two pairs of support portions formed on the barrier member is preferably located near the photographing lens as a first position, and the other pair is preferably located at a second position located farther from the photographing lens than the first position.

Furthermore, two of the four rail portions are formed in the camera body at positions on the two sides of the photographing lens, and the remaining two rail portions are formed by members arranged between the camera body and the barrier member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

An embodiment of the present invention will be described in detail below with reference to the views of the accompanying drawing.

The outer appearance of a camera having a barrier member according to an embodiment of the present invention will be described in detail first with reference to FIGS. 1 to 4B.

Figure 1:
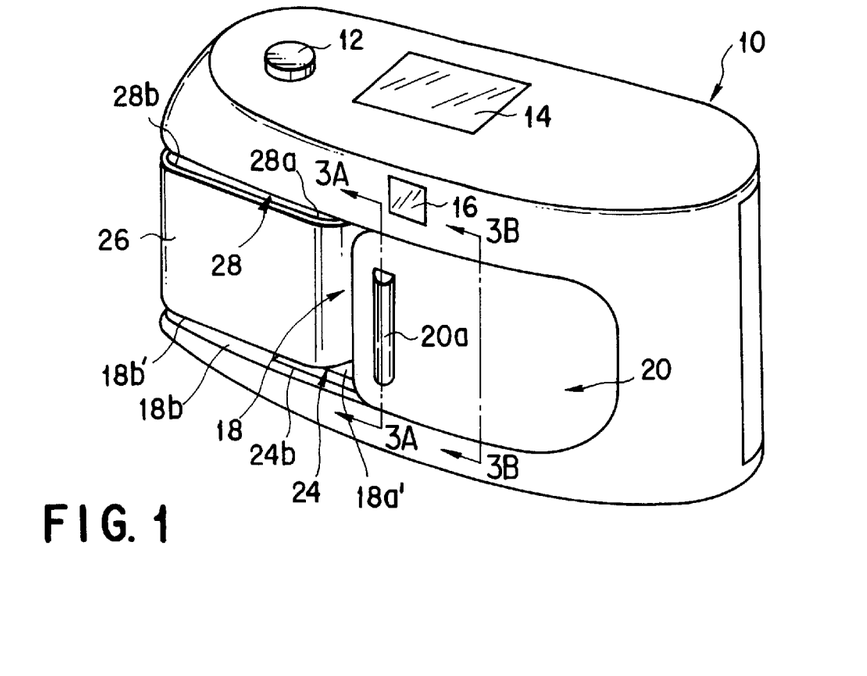
FIG. 1 is a perspective view showing a camera having a barrier member according to an embodiment of the present invention in a state in which the barrier member is placed at a covering position.

FIG. 1 is a perspective view schematically showing a state in which the barrier member of the camera is placed at a covering position (also referred to as a closing position) at which the barrier member covers the photographing lens.

Figure 2:
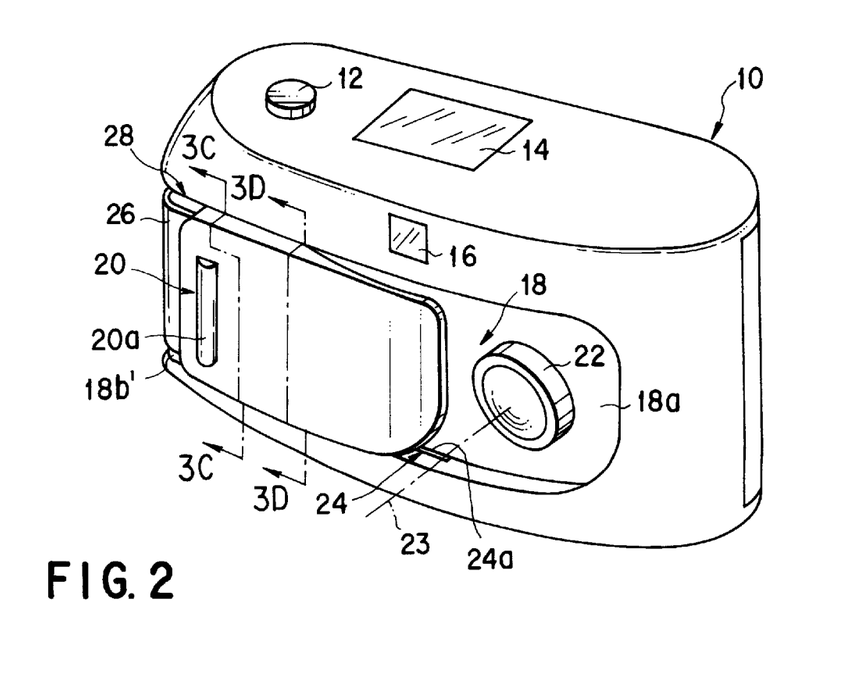
FIG. 2 is a perspective view showing the camera having the barrier member according to this embodiment in a state in which the barrier member is placed at an exposing position.

FIG. 2 is a perspective view schematically showing a state in which the barrier member is placed at an exposing position (also referred to as an opening position at which the barrier member is retracted from the photographing lens) at which the photographing lens is exposed.

FIGS. 3A, 3B, 3C, and 3D are schematic sectional views respectively taken along lines 3A—3A and 3B—3B in FIG. 1 and lines 3C—3C and 3D—3D in FIG. 2.

Figures 4A, 4B:
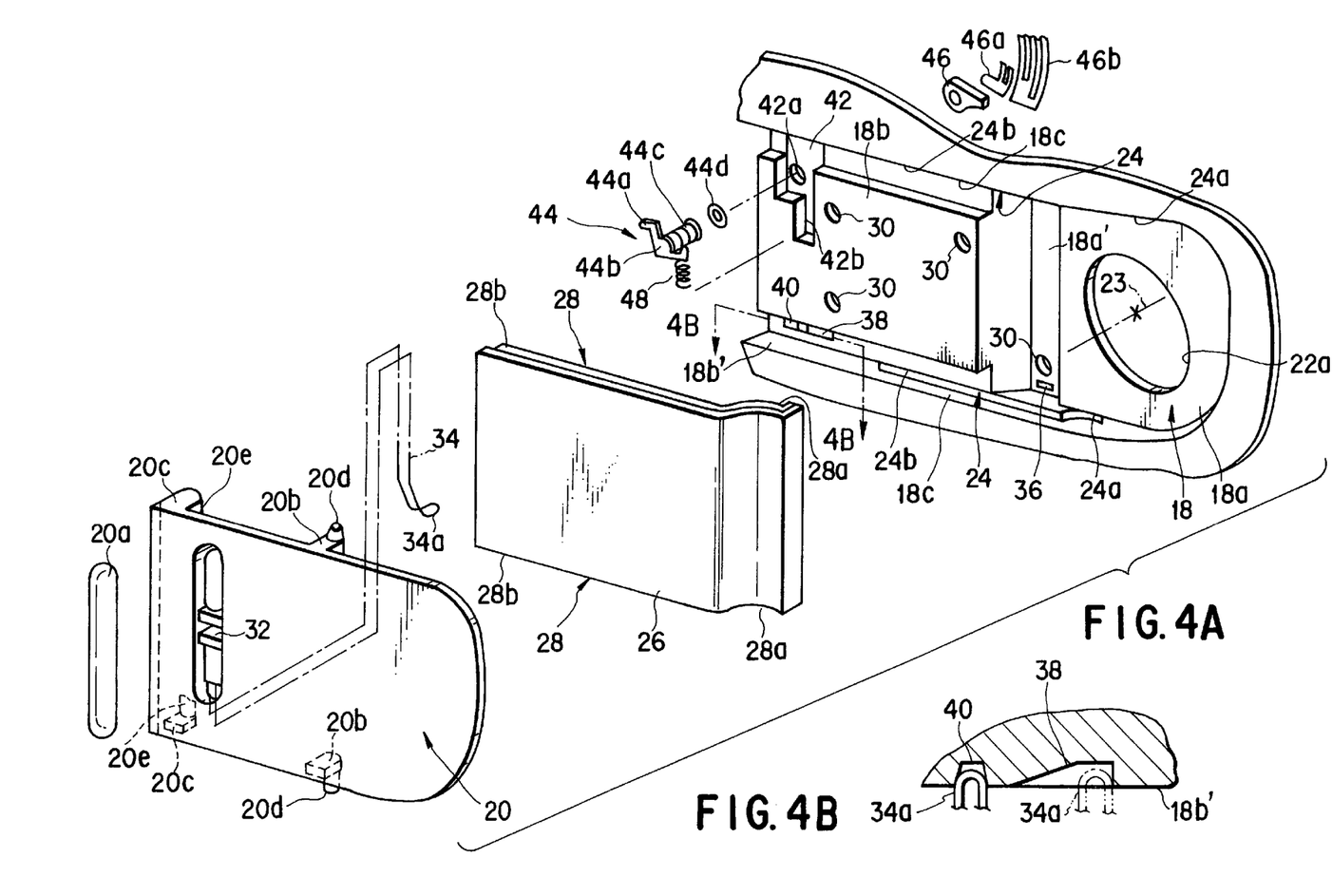
FIG. 4A is an enlarged exploded perspective view showing the recess portion in the outer surface of the outer housing of the camera, in which the barrier member is mounted, in a state in which the barrier member is separated.
FIG. 4B is an enlarged horizontal sectional view taken along a line 4B—4B in FIG. 4A, showing an engaging groove with which a click member for controlling the movement of the barrier member engages.

FIG. 4A is an enlarged exploded perspective view of the barrier member of the camera in FIG. 1 and a portion around that portion of the camera body on which the barrier member is mounted.

FIG. 4B is a sectional view taken along a line 4B—4B in FIG. 4A.

As shown in FIGS. 1 and 2, when an outer housing 10 as the main body of the camera is viewed from above, two side portions are narrower than the central portion, whereas the outer housing 10 has a substantially rectangular shape when viewed from the front and rear sides.

A shutter release button 12 is placed on the upper surface of the outer housing 10 at a right end portion when the outer housing 10 is viewed from the rear side.

A liquid crystal display 14 is mounted in a substantially central portion of the upper surface of the outer housing 10.

An autofocus window 16 and the like are formed on the front surface of the outer housing 10.

Note that "right" and "left" in the following description are based on positions assumed when the outer housing 10 is viewed from the rear side.

An elongated recess portion 18 is formed in the front surface of the outer housing 10 to extend from a central portion to a right end portion.

As clearly shown in FIG. 4A, in particular, a central portion 18a of the recess portion 18 is recessed inwardly deeper than a right end portion 18b.

A barrier member 20 capable of freely moving between the covering position in FIG. 1 and the exposing position in FIG. 2 is mounted in the recess portion 18.

As shown in FIG. 2, a photographing lens 22 is mounted in the central portion 18a of the recess portion 18.

An optical axis 23 of the photographing lens 22 extends in the back-and-forth direction of the outer housing 10.

As shown in FIG. 2, the photographing lens 22 can extend/contract between a photographing preparation position at which the lens protrudes from the central portion 18a of the recess portion 18 and a collapsed position at which the lens is almost flush with the central portion 18a.

When the barrier member 20 is placed at the exposing position in FIG. 2, the photographing lens 22 is placed at the photographing preparation position. Immediately after the barrier member 20 starts moving from the exposing position in FIG. 2 to the covering position in FIG. 1, the photographing lens 22 is moved from the photographing preparation position to the collapsed position so as not to hinder the movement of the barrier member 20 to the covering position.

At the covering position, the outer surface of the barrier member 20 is flush with the surrounding outer surface of the outer housing 10 without any stepped portion. This makes the outer appearance of the camera look sleek.

The barrier member 20 at the exposing position (opening position) faces the right end portion 18b of the recess portion 18 and is retracted from the photographing lens 22 to expose the photographing lens 22.

At the exposing position, the outer surface of the barrier member 20 protrudes forward from the surrounding outer surface of the outer housing 10.

As a consequence, the thickness of the right end portion of the outer housing 10 increases in photographing operation to make it easier for the user of the camera to grip the right end portion.

As shown in FIGS. 3A, 3B, 3C, 3D, and 4A, the recess portion 18 includes a pair of inner surfaces 18/cextending in a substantially horizontal direction to be substantially parallel to each other at positions on the upper and lower sides which oppose each other through the photographing lens 22.

A pair of first movement guide grooves (a pair of rail portions) 24 are formed in the pair of inner surfaces 18c to extend from the central positions of the central portions 18a to substantially the central positions of the right end portions 18b.

FIGS. 4A, 1, and 2 show only the lower first movement guide groove (lower rail portion) 24.

In each of the pair of first movement guide grooves 24, a first portion 24a corresponding to the central position of the central portion 18a is located behind, along the optical axis 23, a second portion 24b corresponding to a portion extending from a right end nearby position 18a, of the central portion 18a to the central position of the right end portion 18b.

A portion extending from the right end nearby position 18a' of the central portion 18a to the right end portion 18b of the recess portion 18 is covered with an independent cover member 26.

The independent cover member 26 has a pair of upper and lower end faces that extend in a substantially horizontal direction to be parallel to each other so as to face the pair of inner surfaces 18c of the recess portion 18.

A pair of second movement guide grooves (a pair of rail portions) 28 are formed in the pair of upper and lower end faces to extend from the right end nearby positions 18a' of the central portions 18a to right end nearby positions 18b', of the right end portions 18b.

FIGS. 4A, 1, and 2 show only the upper second movement guide groove (upper rail portion) 28.

The independent cover member 26 is placed in the recess portion 18 of the outer housing 10 in the above manner to serve as a rail forming member for forming the pair of second movement guide grooves (the pair of rail portions) 28 in the recess portion 18, together with the recess portion 18.

In each of the pair of second movement guide grooves 28, a first portion 28a corresponding to the right end nearby position 18a, of the central portion 18a is located behind, along the optical axis 23, a second portion 28b corresponding to a portion extending to the right end nearby position 18b' of the right end portion 18b.

The barrier member 20 is comprised of a pair of first support portions engaged with the pair of first movement guide grooves 24 of the pair of inner surfaces 18c of the recess portion 18 and a pair of second support portions engaged with the pair of second movement guide grooves 28 in the pair of upper and lower end faces of the independent cover member 26 of the recess portion 18.

Since the pair of first support portions and the pair of second support portions are not shown in FIGS. 1 and 2, they will be described in detail later with reference to FIGS. 3A to 3D and FIGS. 4A and 4B.

When the pair of first support portions move between the first portions 24a and the second portions 24b in the pair of first movement guide grooves 24 along the first movement guide grooves 24, and the pair of second support portions move from the first portions 28a and second portions 28b in the pair of second movement guide grooves 28 along the second movement guide grooves 28, the barrier member 20 moves between the covering position in FIG. 1 and the exposing position in FIG. 2.

An ornamental frame 20a is formed on the outer surface of the barrier member 20.

The user can easily move the barrier member 20 from the covering position to the exposing position with his/her finger if he/she engages the finger with the ornamental frame 20a.

The pair of first movement guide grooves 24 and the pair of second movement guide grooves 28 formed in the recess portion 18 of the outer housing 10 and the pair of first support portions and the pair of second support portions formed on the barrier member 20 will be described in detail next, together with various associated members, with reference to FIGS. 3A to 6.

As shown in FIG. 4A, a photographing lens insertion port 22a in which the photographing lens 22 in FIG. 2 is inserted is formed at the central position of the central portion 18a of the recess portion 18 of the outer housing 10.

A plurality of screw holes 30 in which set screws for fixing the independent cover member 26 are inserted from behind are formed at the right end nearby position 18a', of the central portion 18a of the recess portion 18 and in the right end portion 18b.

A pair of first projection arms 20b are formed on the rear surface of the barrier member 20 to extend rearward at first positions which are spaced apart from the right end portions of the upper and lower end faces of the barrier member 20 by a predetermined distance and located near the photographing lens 22.

A pair of second projection arms 20c extending rearward are formed at second positions which are located farther from the photographing lens 22 than the first positions and correspond to the right end portions of the upper and lower end faces.

The pair of first projection arms 20b oppose each other in the vertical direction, and the pair of second projection arms 20c also oppose each other in the vertical direction.

A pair of outward engaging projections 20d are formed on the tips of the pair of first projection arms 20b to extend away from each other in the vertical direction with respect to the optical axis 23 of the photographing lens 22.

A pair of inward engaging projections 20e are formed on the tips of the pair of second projection arms 20c to extend toward each other in the vertical direction with respect to the optical axis 23 of the photographing lens 22.

A click spring holding hole 32 elongated downward is formed in that portion of the rear surface of the barrier member 20 which corresponds to the ornamental frame 20a.

A substantially U-shaped click spring 34 is fixed in the click spring holding hole 32 by forcibly inserting the distal end portions of a pair of legs of the click spring 34.

Note that the click spring holding hole 32 may be one hole in which both the distal end portions of the pair of legs of the click spring 34 are inserted or a pair of holes in which the distal end portions of the pair of legs of the click spring 34 are independently inserted.

The click spring 34, which is fixed by forcibly inserting the distal end portions of the two legs (directed upward) of the click spring 34 into the click spring holding hole 32 in the rear surface of the barrier member 20, extends downward along the rear surface, obliquely bends downward and rearward, and bends rearward from the rear surface on substantially the same level as that of the lower edge of the barrier member 20.

The distal end portion of the click spring 34 which bends rearward from the rear surface becomes a middle curved portion 34a of the substantially U-shaped click spring 34.

In this case, the elastic force to be applied to the middle curved portion 34a of the click spring 34 can be easily adjusted by changing the length or tilt of the portion that obliquely bends downward and rearward.

A first engaging groove 36 is formed in a lower end portion of the central portion 18a of the recess portion 18 of the outer housing 10 at the right end nearby position 18a'.

Second and third engaging grooves 38 and 40 are formed in a lower end portion of the right end portion 18b of the recess portion 18 at the right end nearby position 18b'.

As is obvious from FIG. 4B, which schematically shows a horizontal cross-section taken along a line 4B—4B in FIG. 4A, two end faces located in the horizontal direction in the third engaging groove 40 tilt at a relatively steep angle of about 45° with respect to the bottom surface of the lower end portion of the right end portion 18b of the recess portion 18 at the right end nearby position 18b'.

Of the two end faces located in the horizontal direction in the second engaging groove 38, the end face nearer to the central portion 18a of the recess portion 18 tilts at a relatively steep angle of about 60° with respect to the bottom surface of the lower end portion.

The end face located farther from the central portion 18a of the recess portion 18 tilts at a relatively gentle angle of about 15° with respect to the bottom surface of the lower end portion.

A recess 42 is formed in the upper end portion of the right end portion 18b of the recess portion 18 of the outer housing 10 at the right end nearby position 18b'.

A through hole 42a is formed in the recess 42.

A power switch lever 44 of the camera is housed in the recess 42.

The power switch lever 44 has a substantially L-shaped front surface and a rotational center shaft 44c extending rearward from the intersection of an upward extending arm 44a and a horizontal extending arm 44b.

A portion near the distal end portion of the rotational center shaft 44c has a polygonal cross-section.

The distal end portion of the rotational center shaft 44c is larger in diameter than the adjacent portion and has a slit extending along the axial direction.

Figure 6:
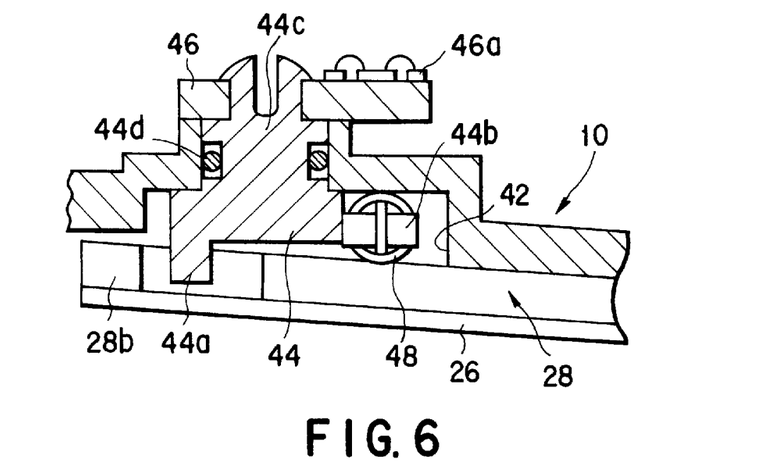
FIG. 6 is a schematic horizontal sectional view taken along a line 6—6 of the power switch in FIG. 5.

As shown in FIGS. 4A and 6, the rotational center shaft 44c is inserted into the through hole 42a in the recess 42 through an 0-ring 44d and protrudes rearward from the rear surface of the outer housing 10.

A terminal base 46 is fitted on that portion of the rotational center shaft 44c which has the above polygonal shape and is adjacent to the distal end portion at a position behind the rear surface of the outer housing 10. The terminal base 46 is forcibly pushed and fitted on the distal end by using the elasticity produced by the above slit.

A terminal (electric contact piece) 46a is fixed on the terminal base 46. The terminal 46a constitutes a power switch for an electric circuit (not shown) in the outer housing 10, together with two contact patterns on a wiring board 46b placed in the outer housing 10 to be adjacent to the rear surface of the outer housing 10.

In this embodiment, while the power switch lever 44 keeps the horizontal extending arm 44b horizontal, the terminal 46a on the terminal base 46 is in contact with only one of the two contact patterns on the wiring board 46b to keep the electric circuit (not shown) in the OFF state.

When the power switch lever 44 is pivoted to move the horizontal extending arm 44b to an upper position from the horizontal position, the terminal 46a on the terminal base 46 comes in contact with the two contact pattern on the wiring board 46b to turn on the electric circuit (not shown).

In the recess 42, a biasing means 48 such as a tension coil spring is interposed between the horizontal extending arm 44b of the power switch lever 44 and an engaging support 42b on the bottom surface of the recess 42.

The biasing means 48 biases the power switch lever 44 to a power-off position at which the horizontal extending arm 44b stays horizontal.

The upward extending arm 44a of the power switch lever 44 protrudes into the right end nearby portion 28b of the second movement guide grooves 28 in the upper edge of the independent cover member 26 fixed in the recess portion 18 of the outer housing 10.

In assembling the camera having the barrier member according to an embodiment of the present invention, which has the arrangement described in detail above, first of all, the power switch lever 44 is placed in the recess 42 at the right end nearby position 18b' of the recess portion 18 in the manner described above, and one pair of ends of the click spring 34 are fixed in the click spring holding hole 32 of the barrier member 20.

One pair of inward engaging projections 20e of the barrier member 20 are then caused to engage with the second movement guide grooves 28 in one pair of upper and lower edges of the independent cover member 26. Meanwhile, the independent cover member 26 is fixed at a predetermined position in the recess portion 18 with set screws 50 inserted from the rear surface of the outer housing 10 into the screw insertion holes 30 in the recess portion 18 of the outer housing 10.

The independent cover member 26 at the predetermined position covers the right end portion 18b of the recess portion 18 and the right end nearby position 18a' of the central portion 18a to ensure a pair of gaps between the pair of upper and lower opposing inner surfaces of the recess portion 18 and the pair of upper and lower end faces of the independent cover member 26 to extend in the horizontal direction to be parallel to each other.

The pair of first projection arms 20b and the pair of second projection arms 20c of the barrier member 20 are disposed in the pair of gaps to be movable along the pair of gaps.

Finally, the pair of outward engaging projections 20d of the barrier member 20 are forced into the pair of first movement guide grooves 24 in the pair of upper and lower inner surfaces of the recess portion 18, thereby completing the assembly.

Figure 3A:
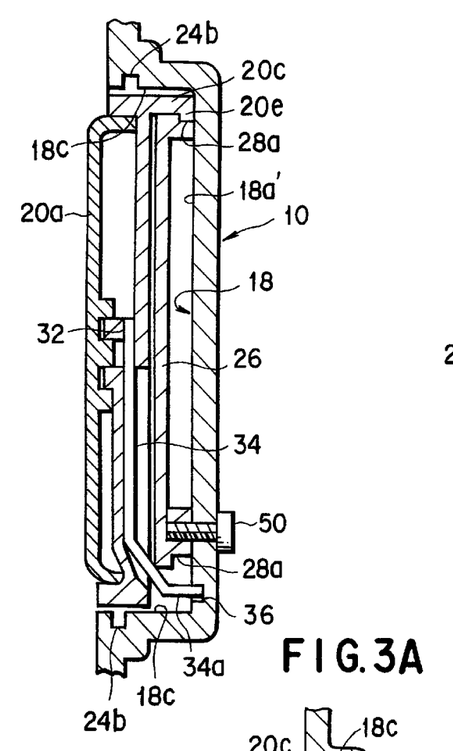
FIG. 3A is a schematic cross-sectional view taken along a line 3A—3A in FIG. 1, showing a state in which a pair of inward engaging projections of the barrier member at the covering position are placed at the first portions, in a pair of second movement guide grooves in the recess portion of an outer housing, which are located near the photographing lens.
Figure 3B:
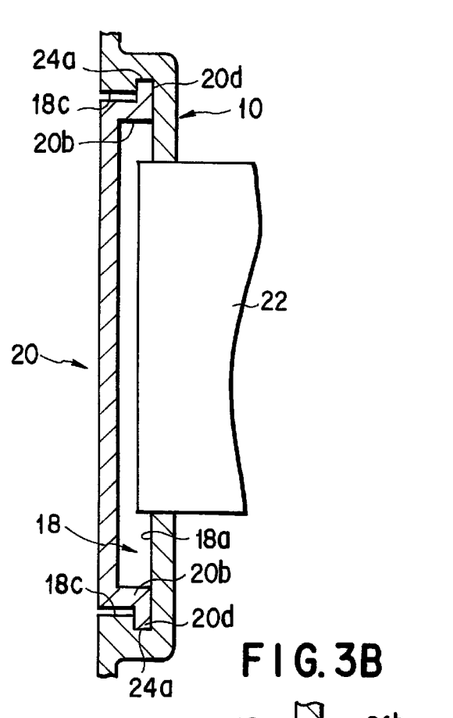
FIG. 3B is a schematic cross-sectional view taken along a line 3B—3B in FIG. 1, showing a state in which a pair of outward engaging projections of the barrier member at the covering position are placed at the first portions, in a pair of first movement guide grooves in the recess portion of an outer housing, which are located near the photographing lens.

The barrier member 20 is moved into the central portion 18a of the recess portion 18, and the pair of outward engaging projections 20d of the barrier member 20 are positioned in the first portions 24a of the pair of first movement guide grooves 24, as shown in FIG. 3B. In addition, the pair of inward engaging projections 20e are positioned in the first portions 28a of the pair of second movement guide grooves 28, as shown in FIG. 3A. As a result, the barrier member 20 is placed at the covering position in FIG. 1.

As shown in FIG. 3B, the barrier member 20 at the covering position covers the front end face of the photographing lens 22 placed at the collapsed position in the central portion 18a of the recess portion 18.

As shown in FIGS. 3A and 3B, the outer surface of the barrier member 20 at the covering position is flush with that portion of the outer surface of the outer housing 10 which surrounds the recess portion 18 without any stepped portion, thus making the outer appearance of the camera look sleek.

As is obvious from FIG. 3A, when the barrier member 20 is placed at the covering position, the curved portion 34a of the click spring 34 of the barrier member 20 engages with the first engaging groove 36 of the lower end of the recess portion 18 at the right end nearby position 18a'.

With this structure, the barrier member 20 cannot be released from the above engagement and cannot move to the exposing position in FIG. 2 unless a predetermined force or more is exerted on the ornamental frame 20a of the barrier member 20 in the direction in which the force acts from the covering position in FIG. 1 to the exposing position in FIG. 2.

When the above engagement is canceled upon exertion of the predetermined force or more on the ornamental frame 20a of the barrier member 20, the barrier member 20 moves in the recess portion 18 from the covering position in FIG. 1 to the exposing position in FIG. 2 along the pair of first movement guide grooves 24 and the pair of second movement guide grooves 28.

During this movement, the pair of outward engaging projections 20d of the barrier member 20 engaged with the pair of first movement guide grooves 24 slide from the first portions 24a to the second portions 24b of these grooves 24.

The pair of inward engaging projections 20e of the barrier member 20 engaged with the pair of second movement guide grooves 28 also slide from the first portions 28a to the second portions 28b of these grooves 28.

With this operation, the barrier member 20 is pushed forward from the state in which the outer surface of the barrier member 20 is flush with that portion of the outer surface of the outer housing 10 which surrounds the recess portion 18. As a result, the outer surface of the barrier member 20 protrudes forward from that portion of the outer surface of the outer housing 10 which surrounds the recess portion 18.

Figure 3C:
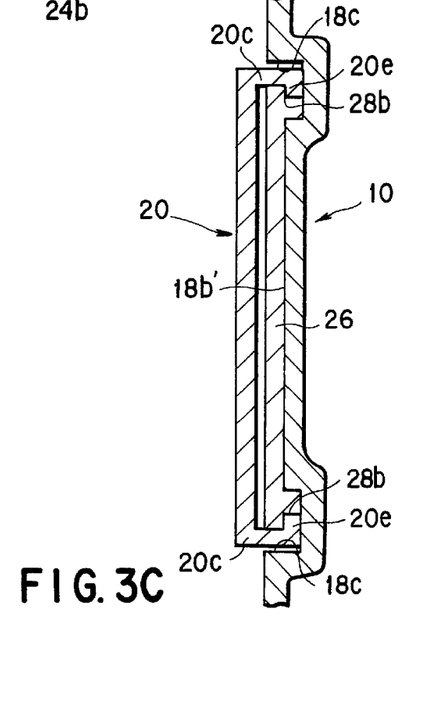
FIG. 3C is a schematic cross-sectional view taken along a line 3C—3C in FIG. 2, showing a state in which a pair of second inward engaging projections of the barrier member at the exposing position are placed at the second portions, in the pair of second movement guide grooves in the recess portion of an outer housing, which are located far from the photographing lens.
Figure 3D:
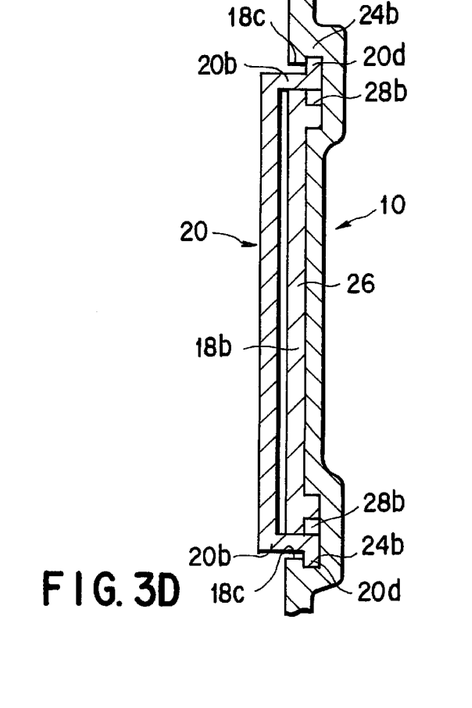
FIG. 3D is a schematic cross-sectional view taken along a line 3D—3D in FIG. 2, showing a state in which the pair of outward engaging projections of the barrier member at the exposing position are placed at the second portions, in the pair of first movement guide grooves in the recess portion of an outer housing, which are located far from the photographing lens.

As shown in FIG. 3D, the pair of outward engaging projections 20d of the barrier member 20 are placed in the second portions 24b of the pair of first movement guide grooves 24.

As shown in FIG. 3C, the pair of inward engaging projections 20e are placed in the second portions 28b of the pair of the second movement guide grooves 28.

As a consequence, the barrier member 20 is placed at the exposing position in FIG. 2.

As shown in FIGS. 3C and 3D, the outer surface of the barrier member 20 at the exposing position protrudes forward from that portion of the outer surface of the outer housing 10 which surrounds the recess portion 18.

The thickness of the right end portion of the outer surface of the outer housing 10 increases to make it easier for the user to grip the right end portion of the outer surface of the outer housing 10 when the photographing lens 22 is used, i.e., a picture is taken.

Figure 5:
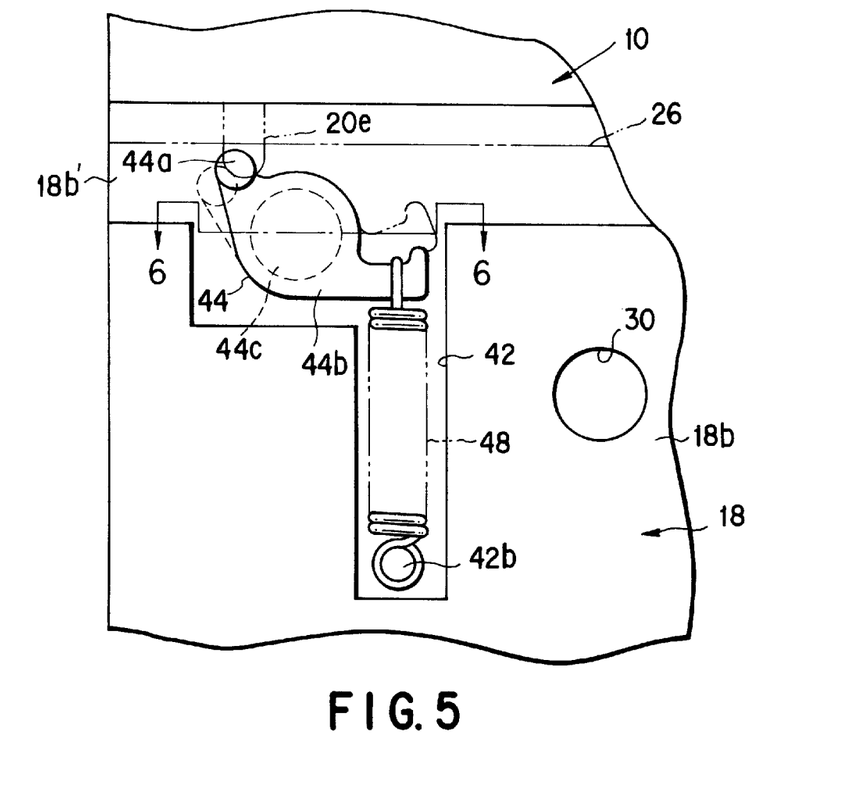
FIG. 5 is a schematic enlarged front view of a power switch of the camera, which is mounted on the upper end of the right end portion at the right end nearby position in the recess portion of the outer housing of the camera and operated upon movement of the barrier member to the exposing position.

As shown in FIG. 5, the upper inward engaging projection 20e of the pair of upper and lower inward engaging projections 20e of the barrier member 20 presses the upward extending arm 44a of the power switch lever 44 against the biasing force of the biasing means 48 immediately before the barrier member 20 reaches the exposing position.

With this operation, the power switch lever 44 rotates to move the horizontal extending arm 44b from the horizontal position indicated by the solid line in FIG. 5 to the upper position indicated by the chain double-dashed line. As a result, the terminal 46a on the terminal base 46 of the power switch lever 44 comes in contact with the two contact patterns on the wiring board 46b in the outer housing 10.

The power switch for the electric circuit (not shown) of the camera having the barrier member according to this embodiment is turned on.

At this time, the photographing lens 22 moves from the above collapsed position to the above protruding position along the optical axis 23, and protrudes forward from the central portion 18a of the recess portion 18, as shown in FIG. 2.

The curved portion 34a of the click spring 34 of the barrier member 20 is inserted in the second engaging groove 38 at the right end nearby position 18b' of the right end portion 18b of the recess portion 18 immediately before the barrier member 20 reaches the exposing position, as indicated by the chain double-dashed line in FIG. 4B.

Since that end face of the second engaging groove 38 which is located farther from the photographing lens 22 is a relatively gentle slope, as shown in FIG. 4B, the click spring 34 quickly disengages from the second engaging groove 38 without receiving any large resistance from the second engaging groove 38.

When the barrier member 20 reaches the exposing position, as shown in FIG. 2, the curved portion 34a of the click spring 34 is inserted and engages in the third engaging groove 40 adjacent to the second engaging groove 38, as indicated by the solid line in FIG. 4B.

That end face of the third engaging groove 40 which is nearer to the photographing lens 22 is a relatively steep slope, as shown in FIG. 4B.

Once the barrier member 20 is placed at the exposing position in FIG. 2, therefore, the barrier member 20 cannot be released from the above engagement and cannot move to the covering position in FIG. 1 unless a predetermined force or more is exerted on the ornamental frame 20a of the barrier member 20 in the direction in which the force acts from the exposing position in FIG. 2 to the covering position in FIG. 1 as in the case in which the barrier member 20 is placed at the covering position in FIG. 1.

When the predetermined force or more is exerted on the ornamental frame 20a of the barrier member 20 to cancel the above engagement, the barrier member 20 moves from the exposing position in FIG. 2 to the covering position in FIG. 1.

Immediately after this movement, the upper inward engaging projections 20e of the barrier member 20 stops pressing the upward extending arm 44a of the power switch lever 44.

With this operation, the power switch lever 44 rotates to restore the horizontal extending arm 44b from the upper position indicated by the chain double-dashed line to the horizontal position indicated by the solid line in FIG. 5 with the biasing force of the biasing means 48.

As a result, the terminal 46a on the terminal table 46 of the power switch lever 44 comes in contact with only one of the two contact patterns on the wiring board 46b in the outer housing 10, as described above.

This turns off the power switch for the electric circuit (not shown) of the camera having the barrier member according to this embodiment.

With this operation, the camera is set in the initial state.

Even if, therefore, the photographing lens 22 is located at the photographing preparation position and protrudes from the barrier member 20 at the covering position in FIG. 1 while the barrier member 20 is placed at the exposing position in FIG. 2, the photographing lens 22 is retracted from the barrier member 20 at the covering position in FIG. 1.

The curved portion 34a of the click spring 34 is inserted in the second engaging groove 38 and engaged therewith, as indicated by the chain double-dashed line in FIG. 4B, immediately after the barrier member 20 starts moving from the exposing position in FIG. 2 to the covering position in FIG. 1.

That end face of the second engaging groove 38 which is nearer to the photographing lens 22 is a relatively steep slope, as shown in FIG. 4B.

The movement of the barrier member 20 therefore temporarily stops at this slope.

This temporary stop produces the following effect.

Even if the barrier member 20 moves excessively fast from the exposing position in FIG. 2 to the covering position in FIG. 1, this temporary stop ensures the time required for the photographing lens 22, which has been located at the photographing preparation position and protruded forward from the barrier member 20 at the covering position in FIG. 1 while the barrier member 20 has been placed at the exposing position, to move rearward from the barrier member 20 at the covering position upon turning off of the power switch for the electric circuit (not shown) of the camera as described above, thereby preventing the barrier member 20 from colliding with the photographing lens 22.

This prevention of collision is important because it eliminates the cause of a failure of the photographing lens 22 or damage thereto.

When the user further pushes the ornamental frame 20a toward the covering position in FIG. 1, the curved portion 34a of the click spring 34 disengages from the second engaging groove 38, and the barrier member 20 which is temporarily stopped resumes moving to the covering position in FIG. 1.

As obvious from the above description, in the camera having the barrier member according to this embodiment, at least the two pairs of support portions which are respectively placed at opposing positions on the two sides of the photographing lens 22 so as to support the barrier member 20 are made up of the combinations of the two pairs of projection arms 20b and 20c formed on the upper and lower edges of the barrier member 20 and the one pair of outward engaging projections 20d and the one pair of inward engaging projections 20e which respectively extend in the directions in which they move away from and nearer to the tips of the two pairs of projection arms 20b and 20c.

Each of the pair of outward engaging projections 20d that engage with the pair of first movement guide grooves 24 and slide therein and the pair of inward engaging projections 20e that engage with the pair of second movement guide grooves 28 and slide therein can be called engaging portions or slide engaging portions.

The at least four rail portions separately engaged with at least the two pairs of support portions on the two sides of the photographing lens 22 are made up of the pair of first movement guide grooves 24, with which the pair of outward engaging projections 20d engage, and the pair of second movement guide grooves 28, with which the pair of inward engaging projections 20e engage.

In the camera having the barrier member according to this embodiment, which has the above arrangement, the barrier member 20 is supported by at least the two pairs of support portions, which are made up of the pair of outward engaging projections 20d and the pair of inward engaging projections 20e which engage with at least the four rail portions constituted by the pair of first movement guide grooves 24 and the pair of second movement guide grooves 28 of the outer housing 10 and the two pairs of projection arms 20b and 20c which are formed on the upper and lower edges of the barrier member 20 and from which the outward engaging projections 20d and the inward engaging projections 20e protrude. Therefore, the barrier member 20 can be smoothly moved between the exposing position and the covering position with a simple arrangement.

As is obvious from the above detailed description, according to the present invention, there is provided a camera having a barrier which can allow a barrier member to smoothly move between the exposing position and the covering position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   a camera body having a photographing lens;
   a barrier member movably mounted with respect to said camera body between an opening position at which said photographing lens is exposed and a closing position at which said photographing lens is covered;
   two pairs of support portions provided on the barrier member and which comprise four projecting portions placed in pairs at opposing positions; and
   four rails provided independent of one another on the camera body and each engaged with a corresponding one of the four projecting portions, two of said rails facing each other and being arranged on an upper side of said photographing lens, and the remaining two rails facing each other and being arranged on a lower side of said photographing lens,
   wherein each of said rails has a first portion that is retracted in a direction of an optical axis of the photographing lens and a second portion that is protruded in said direction of the optical axis of the photographing lens, each of the projecting portions being positioned on the first portion of the corresponding rail when the barrier member is at the closing position, and each of the projecting portions being located on the second portion of the corresponding rail portion when the barrier member is at the opening position, thereby placing the barrier member further forward in the direction of the optical axis when the barrier member is at the opening position as compared to that of the closing position.

2. A camera according to claim 1, wherein the camera body includes an outer housing and a cover member that is fixed to the outer housing, two of said four rails being formed in the outer housing at positions on the two sides of said photographing lens, and the remaining two rails being formed by the outer housing and the cover member.

3. A camera according to claim 1, wherein:
   the two projecting portions of one of said two pairs of support portions project in a direction perpendicular to a moving direction of the barrier member and toward an outer surface of the barrier member,
   the two projecting portions of the other one of the two pairs of support portions project in a direction perpendicular to a moving direction of the barrier member and toward an inner surface of the barrier member, and
   each of the rail portions being provided with a groove which opposes the corresponding projecting portion in a projecting direction thereof.

4. A camera having a barrier which moves between a closing position at which a photographing lens is covered and an opening position at which said barrier is retracted from said photographing lens, comprising:
   a camera body having four independent grooves, two of said grooves being arranged on an upper side of said photographing lens and having openings that face each other, and the remaining two grooves being arranged on a lower side of said photographing lens and having openings that face each other, and said grooves allowing said barrier to move in a direction perpendicular to an optical axis of said photographing lens and allowing said barrier, when said barrier moves from the opening position to the closing position, to retract in a direction of the optical axis of said photographing lens; and four slide engaging portions formed on said barrier, and engaging respectively and sliding in said four grooves, wherein the barrier protrudes in the direction of an optical axis of the photographing lens when the barrier is located at the opening position as compared to the closing position.

5. A camera according to claim 4, further comprising a power switch arranged to be pushed and turned on/off by one of the two pairs of slide engaging portions when the barrier is moved between the closing position at which the photographing lens is covered and the opening position at which said barrier is retracted from said photographing lens.

6. A camera comprising:

a camera body including first and second surface areas, the second surface area being proximate the first surface area, the camera body having within the first surface area a photographing lens which includes an optical axis perpendicular to the first surface area, the camera body having a first pair of parallel grooves arranged on an upper side of said photographing lens and having openings that face each other, and a second pair of parallel grooves arranged on a lower side of said photographing lens and having openings that face each other; and a barrier having a first pair of engaging portions that engage with the first pair of parallel grooves and slide therein, and a second pair of engaging portions that engage with the second pair of parallel grooves and slide therein, said barrier moving between the first surface area, at which said barrier covers and shields the photographing lens, and the second surface area, at which said barrier is retracted from the photographing lens and outwardly protrudes in the direction of the optical axis and the photographing lens is uncovered and exposed.

\* \* \* \* \*